Patented May 31, 1932

1,860,832

UNITED STATES PATENT OFFICE

WILLIAM GORDON BENNETT, OF EPSOM, AND ARTHUR MAURICE PEAKE, OF LONDON, ENGLAND, ASSIGNORS, BY MESNE ASSIGNMENTS, TO STANDARD BRANDS INCORPORATED, OF DOVER, DELAWARE, A CORPORATION OF DELAWARE

TREATMENT OF MOLASSES FOR YEAST GROWTH

No Drawing. Application filed June 12, 1929, Serial No. 370,455, and in Great Britain June 25, 1928.

This invention relates to the treatment of molasses to be used as a culture medium for yeast growth, and has for its chief object to remove from the molasses substances which are deleterious to the growth of a healthy yeast of good colour.

Various processes have been proposed for the preparation of molasses as a culture medium for yeast, but these are not satisfactory, as, either their cost is prohibitive, or else they leave the molasses in a state which is unsuitable to satisfactory yeast growth. It is well known that, when yeast is grown in a molasses medium, the yeast tends to be of a bad colour and deficient in strength and keeping qualities. This is due to inhibiting substances and colouring matters present in the molasses, and also to the lack of sufficient organic nitrogen in a form suitable for its assimilation by the yeast.

The present invention provides a method by which colloids, colouring matters and metallic salts unfavourable to yeast growth are removed from the molasses and in which, at the same time, a suitable nutrient may be provided for the yeast. The essential feature of the present invention consists in removing the above named substances from molasses on the surface of an absorbent and treating the molasses with a protein precipitant and protein. Any excess of protein remaining in the solution after treatment is if desired converted into a food suitable for yeast. It is understood that if the solution already contains sufficient protein, the addition of further protein may be omitted.

The process may be carried out either in two stages, using first the absorbent material and then adding the protein precipitant, or alternatively, the absorbent may be added with the protein precipitant together with additional protein if desired.

A protein precipitant suitable for the purpose in view is a synthetic or natural tannin and for convenience of further description this precipitant will be referred to.

As examples of suitable absorbents, ground nut cake may be mentioned when operating in two stages, and calcium carbonate when proceeding by way of a single operation. In the case of using ground nut cake or similar absorbent substance, which may be subsequently used for preparing nitrogenous nutrients for the yeast, it is added to the molasses and absorbs part of the colouring matter on its surface, a certain amount of protein being dissolved. The ground nut cake, or such-like, is filtered off and after suitable treatment can be used as a nutrient for the yeast in the later stages of manufacture. The filtered solution is then treated with the tannin and refiltered after which the filtrate is ready for the propagation of yeast.

In the case of proceeding by way of a single operation, the molasses solution, which should be neutral or, at most, slightly acid, in reaction, is treated with tannin and finely divided calcium carbonate as absorbent with the addition of proteins if the molasses is deficient in these. The mixture is well stirred and filtered and the filtrate is then ready for the growth of yeast. The protein substances added may be of such a nature that they contain constituents which are not precipitable by tannin and remain in the filtered solution as a suitable nitrogenous food for the yeast.

The following is an example of the manner of carrying out the process:—100 parts of molasses are made up to 250 parts with hot water, neutralized if acid with lime, and if alkaline, with sulphuric acid, and heated to 170° F. for half an hour. 15 parts of ground nut cake crushed to a coarse flour suitable for filtration are mixed with a volume of hot water at 170° F. equal to the final volume of the diluted molasses. The two solutions are mixed, thoroughly stirred and cooled to 60–70° F. The cooled mixture may be slightly alkaline. It is carefully neutralized with sulphuric acid and then filtered. To the filtered molasses is added enough sulphuric acid to give an acidity of about one-twentieth normal $$\frac{(N)}{20},$$

and 2–3 parts of tannin are added gradually with constant stirring. The addition of tannin is continued until a small filtered sample fails to react with either tannin or 1% gelatine solution. At this point the mixture is ready for filtration. The filtered molasses is then ready for yeast growth.

The filtered nut cake can be treated in the usual way for the preparation of peptone but the peptone before use should be treated in the following manner to remove iron and colouring matter:—To 100 parts of cooled peptone wort prepared in any known manner are added enough lime to make the mixture slightly but distinctly alkaline, and 0.25 parts of sodium sulphide. It is allowed to stand for 1 or 2 hours and then filtered. The filtrate, made slightly acid and mixed with 0.33% of decolourizing carbon, is stood until required for use and then filtered.

The following is a second example of the manner of carrying out the process:—100 parts of molasses are diluted to 500 parts with hot water at about 170° F. and 2-3 parts of tannin and 5 parts of finely divided calcium carbonate as absorbent are added. In case of molasses which are deficient in protein substances, 1-2 parts of a suitable protein, for example horse blood serum, may be added. The mixture is well stirred for about half an hour and is then filtered and ready for use.

It must be understood that the above are given as examples only and must not be taken as in any sense limiting the process to the reagents or amounts of reagents mentioned.

The term "molasses" hereinbefore used is to be understood as applying to molasses of every type such for example as cane molasses, beet molasses, concentrated impure syrups from sorghum and carob or from the hydrolysis of cellulosic materials, and impure concentrated sugar solutions of such a nature that they cannot be treated economically for the production of crystallized sugar.

What we claim is:—

1. A process for rendering molasses suitable as a nutrient medium for yeast growth, comprising the treatment of the molasses with an adsorbent, to remove coloring matter, and a protein-precipitant in the presence of added protein, to remove colloidal matter.

2. A process for rendering molasses suitable as the nutrient medium for yeast growth, comprising the treatment of the molasses first with an adsorbent, to remove coloring matter and then with a protein-precipitant in the presence of added protein, to remove colloidal matter.

3. A process for rendering molasses suitable as a nutrient medium for yeast growth, comprising the treatment of the molasses with ground nut cake and a protein-precipitant, to remove colloidal matter.

4. A process for rendering molasses suitable as a nutrient medium for yeast growth, comprising the treatment of the molasses with calcium carbonate and a protein-precipitant, to remove colloidal matter.

5. A process for rendering molasses suitable as a nutrient medium for yeast growth, comprising the treatment of the molasses first with ground nut cake as adsorbent, to remove coloring matter, and then with a tannin as protein-precipitant to remove colloidal matter.

6. A process for rendering molasses suitable as a nutrient medium for yeast growth, comprising the simultaneous treatment of the molasses with calcium carbonate as adsorbent and a tannin as protein-precipitant, to remove coloring and colloidal matter.

7. A process for rendering molasses suitable as a nutrient medium for yeast growth, comprising the treatment of the molasses with an adsorbent and a protein-precipitant, in the presence of added horse blood serum.

8. A process for rendering molasses suitable as a nutrient medium for yeast growth, comprising the simultaneous treatment of the molasses with calcium carbonate as adsorbent and tannin as protein-precipitant, in the presence of added horse blood serum.

9. A process for rendering molasses suitable as a nutrient medium for yeast growth, comprising mixing ground nut cake suspended in hot water with an approximately equal volume of the molasses in diluted condition and after the material has acted to remove coloring matter adding a tannin to the treated molasses, to remove colloidal matter.

10. A process for the treatment of molasses, which comprises diluting molasses, neutralizing, heating to a temperature below boiling, adding thereto an adsorbent material, cooling to a temperature about normal, acidifying, and then adding a protein precipitant.

11. A process for the treatment of molasses, which comprises diluting molasses, neutralizing, heating to a temperature below boiling, adding thereto an adsorbent material at about the same temperature, cooling to a temperature about normal, acidifying with a mineral acid, and then adding a protein precipitant.

12. A process for the treatment of molasses, which comprises diluting molasses, neutralizing, heating to a temperature below boiling, adding thereto an adsorbent material containing protein substances, cooling to a temperature about normal, acidifying and then adding a protein precipitant.

13. A process for the treatment of molasses, which comprises diluting molasses, neutralizing, heating to a temperature of about 170° F., adding thereto an adsorbent material in volume about equal to that of the diluted molasses and at a temperature of about 170° F., cooling to a temperature of about 60° to 70° F., acidifying with sulphuric acid and then adding a protein precipitant.

14. A process for the treatment of molasses, which comprises diluting molasses, neutralizing, heating to a temperature of about 170° F., adding thereto an adsorbent material in volume about equal to that of the diluted molasses and at a temperature of about 170° F., cooling to a temperature of about 60° to 70° F., acidifying with sulphuric acid, adding a protein precipitant and a source of protein suitable as a yeast nutrient.

15. A process for the treatment of molasses, which comprises diluting molasses, neutralizing, heating to a temperature of about 170° F., adding thereto an adsorbent material in volume about equal to that of the diluted molasses and at a temperature of about 170° F., cooling to a temperature of about 60° to 70° F., acidifying with sulphurc acid, adding a protein precipitant and a horse blood serum as a source of protein suitable as a yeast nutrient.

16. A process for the treatment of molasses, which comprises diluting molasses, neutralizing, heating, adding thereto ground nut cake, cooling to a temperature about normal, acidifying and then adding a tannin.

17. A process for the treatment of molasses, which comprises diluting molasses neutralizing, heating to a temperature about 170° F., adding thereto ground nut cake suspended in a liquid of about equal volume to that of the diluted molasses and at a temperature of about 170° F., cooling to a temperature of about 60° to 70° F., acidifying with sulphuric acid to about one-twentieth of normal and then adding tannin with constant stirring and filtering.

In testimony whereof we have signed our names to this specification.

WILLIAM GORDON BENNETT.
ARTHUR MAURICE PEAKE.